G. B. REID.
SHOCK ABSORBER.
APPLICATION FILED MAR. 27, 1913.
1,071,463.
Patented Aug. 26, 1913.
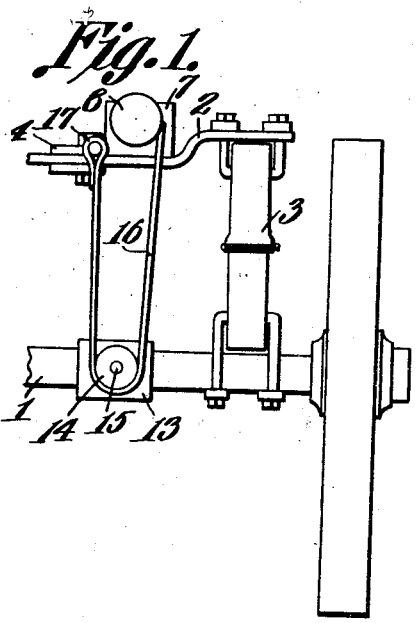
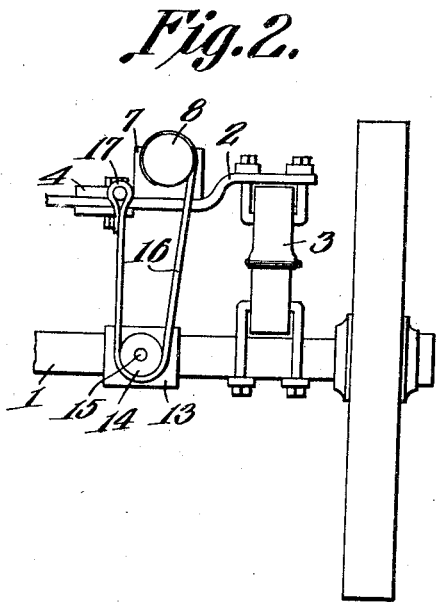
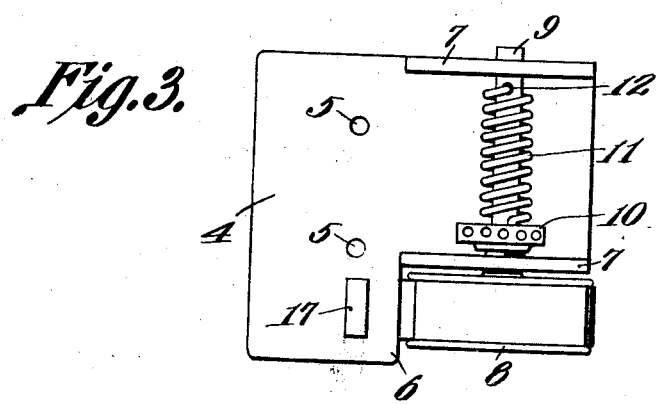
Witnesses
George B. Reid,
Inventor
by C. A. Snow & Co.
Attorneys

UNITED STATES PATENT OFFICE.

GEORGE B. REID, OF ABERDEEN, WASHINGTON.

SHOCK-ABSORBER.

1,071,463.

Specification of Letters Patent. Patented Aug. 26, 1913.

Application filed March 27, 1913. Serial No. 757,230.

*To all whom it may concern:*

Be it known that I, GEORGE B. REID, a citizen of the United States, residing at Aberdeen, in the county of Chehalis and State of Washington, have invented a new and useful Shock-Absorber, of which the following is a specification.

This invention relates to a shock absorber and more particularly to a brake or shock absorbing device adapted to be positioned upon a vehicle for the purpose of absorbing and eliminating those abnormal stresses which tend to injure the springs and to produce unpleasant and injurious vibrations of the vehicle frame.

This invention has for an object to provide a device which will offer a resistance to the rebound of the vehicle body, increasing in proportion as the force of the rebound is increased.

A further object is to provide an efficient shock absorbing device which will be simple in construction, cheap to manufacture and efficient in its operation.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a front view of a portion of a vehicle showing my improved shock absorber secured thereto. Fig. 2 is a similar view with the vehicle spring compressed. Fig. 3 is a plan view of the drum supporting mechanism of my improved shock absorber.

Referring to the drawings in which similar reference numerals designate corresponding parts throughout the several views, 1 represents the cylindrical portion of a vehicle axle which is secured to the frame 2 by means of the usual elliptical or semi-elliptical spring 3 and my improved shock absorbing device is adapted to prevent any sudden relative movement of the axle 1 and the frame 2 and to further, eliminate or absorb a rebound of the spring such as would take place when the axle 1 is suddenly forced toward the frame 2 as illustrated in Fig. 2 and then rebounds to the position as illustrated in Fig. 1.

Rigidly secured to the frame 2 is a plate 4 provided with apertures 5 therein whereby the said plate may be suitably secured to the frame 2. The plate is cut away as at 6 and the upstanding bearing members 7 rotatably mount a drum 8 which fits within the said cut-away portion 6. The bearing members 7 are upstanding plates through which suitable apertures have been cut and extending through the said apertures is a shaft 9 to one end of which is rigidly secured the drum 8. Secured to the bearing member 7 which is adjacent the drum 8 is a spring adjusting member 10 which threadedly engages the said member 7 and is adapted to be locked thereto. A torsional spring 11 is rigidly secured to the shaft 9 as at 12 and the front end of said torsional spring 11 is rigidly secured to the spring adjusting member 10, from which it will be apparent that the spring 11 is adapted to resiliently control the movements of the drum 8 and that furthermore the torsional stress exerted upon the drum 8 by reason of the spring 11 may be adjusted by reason of the member 10. Secured to the vehicle axle 1 is the sleeve 13 which supports a pulley 14 thereon and it is to be noted that the pulley 14 may be locked rigid with respect to its supporting shaft 15, the purpose being hereinafter more fully set forth. A friction belt or strap 16 is secured to the drum 8 and it is adapted to wind about the same as illustrated in Fig. 2 of the drawings. The remote end of the said belt or strap 16 is rigidly secured to the plate 4 as at 17. The said belt or strap 16 passes down from the securing plate 4 around the pulley 14 and then upward and to the drum 8 to which it is secured.

One of the particular advantages attached to my improved device lies in the fact that the friction between two contacting surfaces is a function of and directly proportionate to the pressure between the said surfaces, from which it will be apparent that should the axle 1 be forced toward the vehicle frame 2 as would happen when the wheels hit an irregularity in the road or other surface, the tendency of the frame 2 to rebound will be proportionately increased and therefore the pressure exerted upon the belt by reason of the pulley 14 will also be increased and therefore the friction between the said pulley and the belt will be magnified and the shock thereby successfully absorbed. The normally tendency of the drum to rotate insures that the belt 16 will be held in frictional engagement with the pulley 14.

From the foregoing it will be apparent that my improved shock absorbing device will offer a resistance to the movement of the parts to which it is attached directly proportional to the force or stress tending to cause the said movement. Furthermore, it will be apparent that my improved shock absorbing device may be attached to any relatively movable parts which are subject to shocks or other abnormal stresses. Should the occasion so arise when it is not desirous or advantageous to utilize the friction between the belt and the pulley 14, the said pulley may be unkeyed or rotatably secured to its supporting shaft 15 and the torsional stress of the spring 11 will then be suitably increased so that the spring 11 may successfully take up and absorb any shocks which may be experienced by the axle 1. Also it will be apparent that the pulley 14 may be secured to its supporting shaft in a frictional manner and while not rigidly secured thereto may be allowed to rotate with frictional engagement therewith. It will be apparent that any shocks experienced by the elliptical springs 3 will be taken up by the friction of the belt 16 upon the outer peripheral surface of the drum 8, by the friction experienced by the pulley 14 and its supporting shaft 15 and by reason of the torsional strength of the spring 11.

Having thus fully described the construction and operation of my improved device, what I claim to be new and original with me is:—

1. The combination with a vehicle frame and axle, a cylindrical member secured to said axle, of a shock absorbing device comprising a drum, a rotatable shaft secured thereto, a torsional spring secured to said shaft and to said frame adapted to rotate said shaft, a friction belt secured to said frame extending around said cylindrical member on the axle and the other end of said belt secured to said drum adapted to wind about the same, said drum adapted to hold said belt in frictional engagement with said cylindrical member on said axle.

2. In a shock absorbing device the combination of a vehicle axle, a frame supported thereabove, a pulley secured to said axle, a drum secured to a shaft, said shaft mounted upon said frame, a torsional spring secured to said frame and to said shaft and adapted to rotate said drum, a friction belt secured to said drum adapted to wind upon the same and passing around the pulley on the axle and the remote end of said belt secured to said frame.

In testimony that I claim the foregoing as my own, I have hereto affixed my signature in the presence of two witnesses.

GEORGE B. REID.

Witnesses:
 M. J. HARTLEY,
 C. W. BECKER.